United States Patent
Diederich et al.

(10) Patent No.: US 9,614,716 B2
(45) Date of Patent: Apr. 4, 2017

(54) CONTROLLER MAINTENANCE IN A NETWORK-ATTACHED STORAGE SYSTEM

(71) Applicant: International Business Machines Corporation, Armonk, NY (US)

(72) Inventors: Michael Diederich, Mainz (DE);
Nikhil Khandelwal, Tucson, AZ (US);
Thorsten Muehge, Budenheim (DE);
Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 14/246,540

(22) Filed: Apr. 7, 2014

(65) Prior Publication Data
US 2015/0288556 A1 Oct. 8, 2015

(51) Int. Cl.
| | |
|---|---|
| H04L 12/24 | (2006.01) |
| H04L 29/08 | (2006.01) |
| H04L 29/12 | (2006.01) |
| H04L 29/14 | (2006.01) |
| H04L 29/06 | (2006.01) |

(52) U.S. Cl.
CPC ......... *H04L 41/04* (2013.01); *H04L 61/1511* (2013.01); *H04L 67/1036* (2013.01); *H04L 67/1097* (2013.01); *H04L 67/14* (2013.01); *H04L 67/2814* (2013.01); *H04L 67/42* (2013.01); *H04L 69/40* (2013.01); *H04L 61/2007* (2013.01)

(58) Field of Classification Search
USPC ....................................................... 709/223
See application file for complete search history.

(56) References Cited

U.S. PATENT DOCUMENTS

| | | | |
|---|---|---|---|
| 8,151,021 B1 | 4/2012 | Glade et al. | |
| 8,364,843 B2 | 1/2013 | Hanselmann | |
| 2004/0153740 A1* | 8/2004 | Fujimoto | G06F 11/2089 714/6.31 |
| 2009/0241100 A1 | 9/2009 | Sakurai et al. | |
| 2011/0107135 A1* | 5/2011 | Andrews | G06F 8/67 714/2 |

(Continued)

FOREIGN PATENT DOCUMENTS

WO   2008126325 A1   10/2008

OTHER PUBLICATIONS

Linux Virtual Server Project, "LVS Introduction—Load Balancing Server Cluster", http://www.linuxvirtualserver.org/whatis.html, Accessed on Apr. 2, 2014, p. 1.

(Continued)

*Primary Examiner* — Vivek Srivastava
*Assistant Examiner* — Hien Doan
(74) *Attorney, Agent, or Firm* — Michael O'Keefe

(57) ABSTRACT

Performing maintenance to controllers in a network-attached storage system that includes two or more controllers, each controller including at one or more associated IP address. An online controller in the network-attached storage system to upgrade is identified. The IP addresses of the online controller to upgrade is moved to another controller in the network-attached storage system. Simultaneous with when the other controller is online, the online controller to upgrade is taken offline and upgraded the controller to upgrade.

12 Claims, 8 Drawing Sheets

(56) References Cited

U.S. PATENT DOCUMENTS

| | | | |
|---|---|---|---|
| 2011/0252192 A1* | 10/2011 | Busch | G06F 17/30519 |
| | | | 711/105 |
| 2011/0252209 A1 | 10/2011 | Lee | |
| 2011/0307541 A1* | 12/2011 | Walsh | H04L 67/1019 |
| | | | 709/203 |
| 2012/0023146 A1 | 1/2012 | Shoji et al. | |
| 2013/0073667 A1* | 3/2013 | Mukkara | G06F 9/5061 |
| | | | 709/213 |
| 2013/0198350 A1 | 8/2013 | Moore et al. | |
| 2013/0212264 A1* | 8/2013 | Troppens | H04L 29/12207 |
| | | | 709/224 |

OTHER PUBLICATIONS

Wikipedia, "Network-attached storage", http://en.wikipedia.org/wiki/Network-attached_storage, Accessed on Apr. 2, 2014, p. 1-6.
Wikipedia, "Round-robin DNS", http://en.wikipedia.org/wiki/Round_robin_DNS, Accessed on Apr. 2, 2014, p. 1-2.

* cited by examiner

CONTROLLER MAINTENANCE IN A NETWORK-ATTACHED STORAGE SYSTEM

FIELD OF THE INVENTION

The present invention relates generally to the field of network-attached storage systems, and more particularly to performing maintenance, such as software upgrades, on controllers that control access to data in network-attached storage systems.

BACKGROUND OF THE INVENTION

Network-attached storage (NAS) is file-level computer data storage attached to a server or controller, which is connected to a computer network for providing data access to a group of client computers. An NAS system typically includes multiple NAS devices and multiple servers, and may allow shared access to all NAS devices by all servers.

SUMMARY

Embodiments of the present invention disclose a method, computer program product, and system for performing maintenance to controllers in a network-attached storage system that includes two or more controllers, each controller including one or more associated IP address. An online controller in the network-attached storage system to upgrade is identified. The IP addresses of the online controller to upgrade is moved to another controller in the network-attached storage system. Simultaneous with when the other controller is online, the online controller to upgrade is taken offline and upgraded the controller to upgrade.

DETAILED DESCRIPTION

Figure 1:
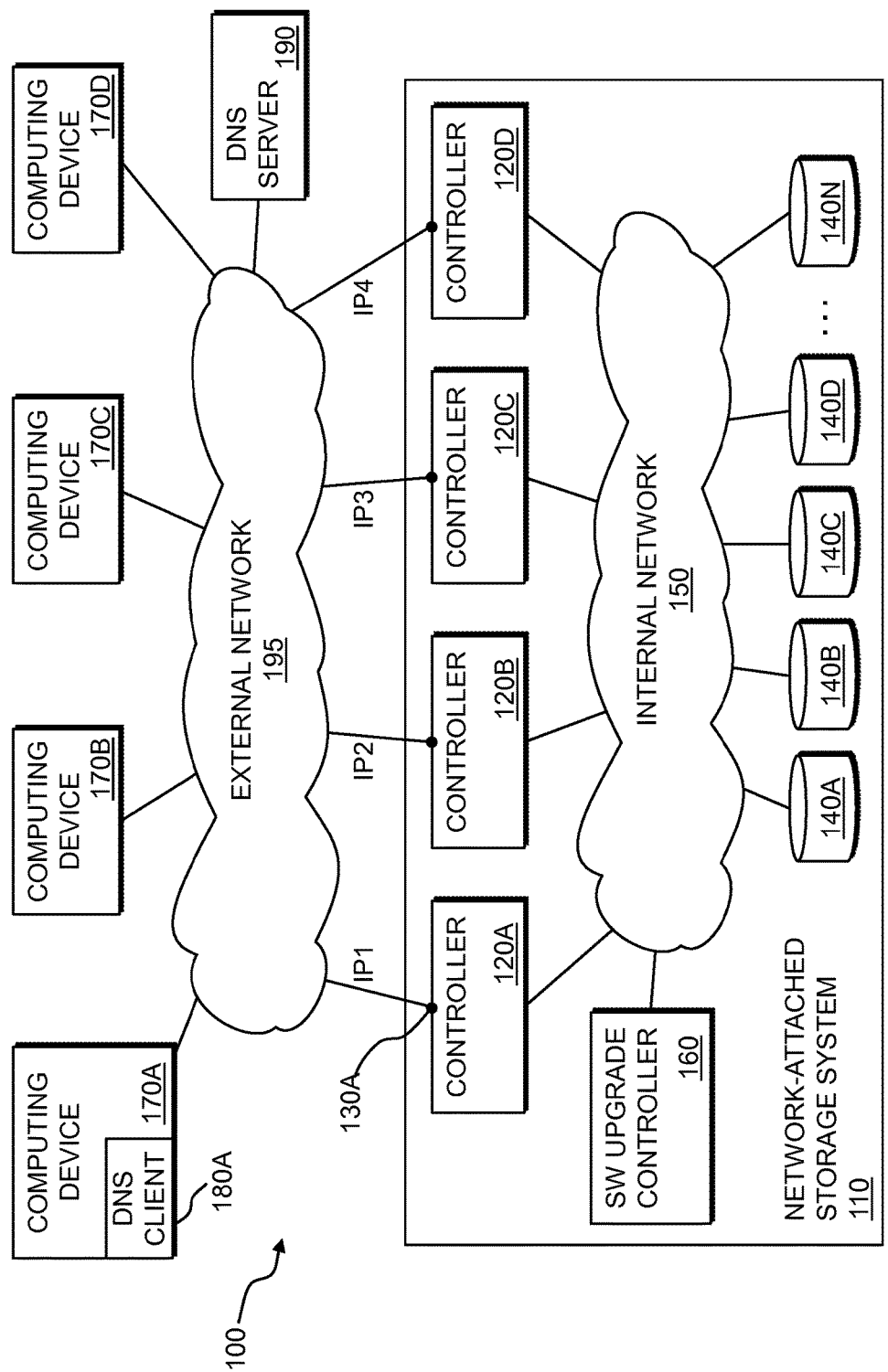
FIG. 1 is a functional block diagram illustrating an NAS system environment, in accordance with one embodiment of the present invention.

In NAS systems, access to files on NAS devices is typically provided through servers or controllers connected to a TCP/IP data network. Client computing devices attached to the network may request a desired file with a "file handle," which is an externally managed reference to a file, similar to a web page URL, which usually includes the external name of the NAS system and the file name.

A name server, usually referred to as a domain name server (DNS), attached to the network may resolve the file handle to one or more network IP addresses associated with an NAS controller. When a controller becomes unavailable, for example, because of a hardware or network problem, a DNS feature referred to as a failover solution may ensure that network services on public-facing servers remain available. A typical failover solution may include, for example, a periodic monitoring of the servers to detect an outage, and a scheme by which a secondary IP address, for example, the IP address of a hot backup server, is substituted by the DNS for primary server address in the "A" record when a server does not respond as expected to a monitoring request. In recognition of the DNS and application server resources that would be spent on generating and responding to failover monitoring request, to reduce falsely detected application server outages, and to reduce network traffic associated with requests, a balance is struck between the DNS having real-time application server status, and a reasonable cost of the monitoring. Typically, a failover scheme may send a monitoring request, for example, every 300 seconds to each application server being monitored. Depending on the DNS network sub-architecture, and other factors, such as DNS time-to-live (TTL) settings, propagating a failover change throughout a network could take several hours.

A DNS may allow for a file handle to be resolved to more than one IP address. For example, if several redundant servers, each with a different IP address, support a network application, the DNS may resolve each subsequent request for the application to an IP address in a list of the IP addresses of another redundant server. The DNS may return the IP addresses from the list in, for example, a round robin manner. While this approach may help with, for example, load balancing of the network servers, a DNS failover scheme, or a scheme not directly involving a DNS, may still be needed if one of the redundant servers becomes unavailable.

For planned server outages in an NAS system, it may be advantageous to have an IP address scheme in which redirection of incoming network traffic to application servers is handled locally by the NAS system and does not involve updates to network DNSs, such as by a failover solution. In embodiments of the invention, the IP address or addresses of an NAS controller that is removed from service, for example, for maintenance, such as a software upgrade, are assigned to another live, or hot standby, NAS controller by the NAS system. Embodiments of the invention are not required to directly involve the network DNSs. In this manner, new file access requests received by the NAS system will be seamlessly directed to another NAS system controller. In certain embodiments, active file access requests on a controller that has been taken out of service may be drained such that there are no active file accesses, or an acceptably low number of active accesses, before the controller is taken offline.

FIG. 1 is a functional block diagram illustrating an NAS system environment 100, in accordance with one embodiment of the present invention. NAS system environment 100 includes computing devices 170A-170D and a DNS server 190 connected over an external network 195 to an NAS system 110. Each computing device 170 includes a DNS client 180, as exemplified by DNS client 180A of computing device 170A. NAS system 110 includes controllers 120A-120D, each having one or more access points 130, as represented by access point 130A of controller 120A, by which the controller physically connects to external network 195. An access point 130 may include a network interface card (NIC). When logically connected to network 195, an access point 130 will be associated with one or more IP addresses, as represented by IP address IP1 associated with access point 130A. Controllers 120 are connected via an internal network 150 to NAS devices 140A-140N. Controllers 120 are also connected via internal network 150 to a software upgrade controller 160, which operates in accordance with various embodiments of the invention.

External network 195 may be, for example, a local area network (LAN), a wide area network (WAN) such as the Internet, or a combination of the two, and can include wired, wireless, or fiber optic connections. In general, external network 195 can be any combination of connections and protocols that will support communications between computing devices 170, DNS server 190, and NAS system 110, in accordance with an embodiment of the invention.

Similarly, internal network 150 may be, for example, a local area network (LAN), a wide area network (WAN) such as the Internet, or a combination of the two, and can include wired, wireless, or fiber optic connections. Internal network 150 may be a private, or managed, network. In general, internal network 150 can be any combination of connections and protocols that will support communications between controllers 120 and software upgrade controller 160, in accordance with an embodiment of the invention.

A computing device 170, DNS server 190, a controller 120, and software upgrade controller 160 may be a laptop computer, tablet computer, netbook computer, personal computer (PC), a desktop computer, a tablet computer, a personal digital assistant (PDA), a smart phone, or any programmable electronic device, in accordance with embodiments of the invention. Each of these components may be generally described with relation to FIG. 8, although each may be optimized with special purpose software and/or hardware to better perform its specific function within NAS system environment 100, in accordance with embodiments of the invention.

A network-attached storage device 140 may be a special purpose computer that provides file-based storage services to other devices, for example, computing devices 170. In an exemplary embodiment, network-attached storage devices 140 are special purpose computing devices that host an operating system that is specially designed to efficiently address the requirements of a network-attached storage system. Network-attached storage devices 140 may include storage media, such as an electronic storage device, a magnetic storage device, an optical storage device, an electromagnetic storage device, a semiconductor storage device, or any suitable combination of the foregoing, as described in more detail below with respect to a computer readable storage medium of FIG. 8. Network-attached storage devices 140 may include, or be arranged to provide, a level of redundancy, such as a redundant array of inexpensive disks (RAID), which may ensure a high level of availability.

In various embodiments, controllers 120 of network-attached storage system 110, may support access to files located on network-attached storage devices, such as network-attached storage devices 140, via various file-based protocols, such as CIFS, FTP, NFS, and HTTP. File-based protocols may be characterized as "stateless" or "stateful" protocols. Stateless protocols, such as NFS and HTTP, do not maintain a session context on the server side. A stateless protocol treats each I/O request as an independent transaction which is not related to any previous I/O request. If a controller 120 of network-attached storage system 110 fails while it is processing an I/O request from, for example, a computing device 170, the I/O request may time out on the computing device 170 and the computing device may resend the I/O request. The resent I/O request may be redirected to a different controller 120 that is online, which may successfully respond to the request by transmitting the requested data.

In contrast, stateful protocols, such as CIFS and FTP, maintain a session context at least until all I/O requests of a session have completed. If a controller 120 of network-attached storage system 110 fails while it is processing an I/O request from, for example, a computing device 170, the computing device may resend the I/O request. However, if the I/O request is redirected to a different controller 120, that controller will have no information on the session context, and resent and redirected I/O request may abort. Consequently, controller failures of a network-attached storage system 110 are visible on computing devices which connect via a stateful protocol. In embodiments of the invention, at least one stateful protocol is supported by two or more controllers 120 and one or more computing devices 170.

The limitations of stateful protocols described above may increase the impact to service of maintenance tasks on controllers 120 of network-attached storage system 110. In particular, when a software upgrade to controllers 120 is required or desired, an upgrade plan designed to reduce impact to service may include, for example, taking a set of one or more of the controllers offline one set at a time to upgrade. This may provide a continued level of overall availability. However, stateful sessions that were lost when a set of controllers were taken offline and reestablished with other controllers may be lost again if the reestablished sessions are to controllers in the next set to be taken offline and upgraded.

In various embodiments of the invention, as will be described in more detail below with respect to FIGS. 2-8, a software upgrade controller 160 causes the IP addresses of a controller 120 that is to be upgraded to be transferred to another live controller 120. New stateful sessions to the transferred IP address will be seamlessly established on the other controller 120. Established stateful connections of the old controller 120 may be aborted when the controller is taken offline for upgrade. An I/O request for a stateless protocol may be lost. However, the scheme by which software upgrade controller 160 transfers IP addresses among controllers 120 during a controller upgrade operation may otherwise reduce the impact to service of the upgrades.

Figure 2:
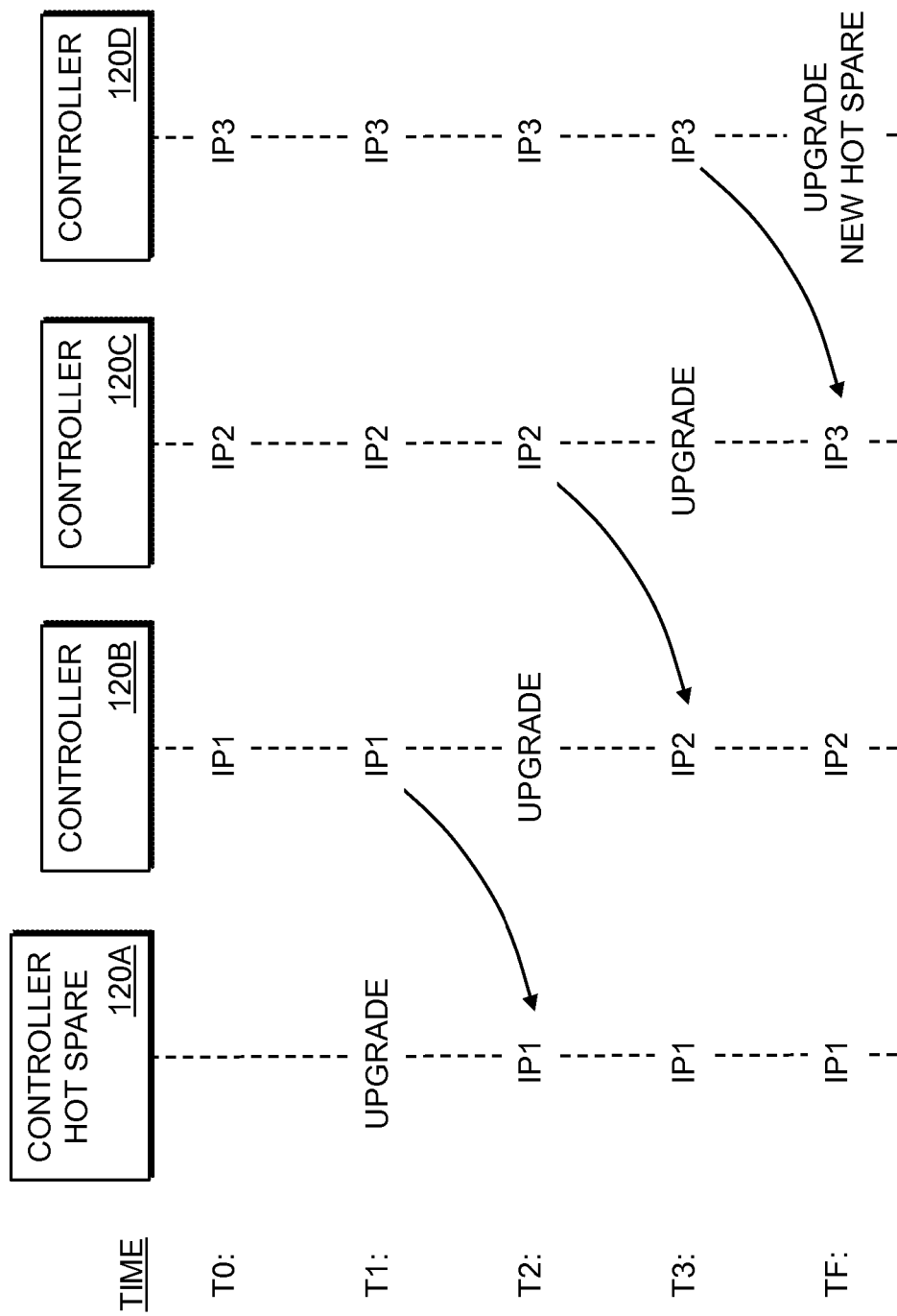
FIG. 2 is a diagram illustrating an upgrade operation, in accordance with an embodiment of the invention.

FIG. 2 is a diagram illustrating an upgrade operation, in accordance with an embodiment of the invention. In this embodiment of network-attached storage system 110, controller 120A acts as a hot spare. At T0, controllers 120B, 102C, and 120D are in normal operation, and controller 120A is offline, but is operating as a hot spare in a standby mode.

At time T1, software upgrade controller 160 takes controller 120A out of hot spare mode, and performs a software upgrade to the controller.

At time T2, software upgrade controller 160 identifies a controller to upgrade, for example, controller 120B, and moves the one or more IP addresses of controller 120B, represented by IP address IP1, to newly upgraded controller 120A and controller 120A is brought online. This may be accomplished, for example, by an appropriate administrative command issued by software upgrade controller 160 that changes the IP addresses of the NIC cards of the access points 130 of controllers 120A and 120B. Simultaneous to when the IP addresses of controller 120B are moved to controller 120A, controller 120A is brought online. As used herein, the term simultaneous means occurring at approximately the same time, and either of two simultaneous events or conditions may occur or exist before the other.

New requests from computing devices 170 to establish a stateful session that are directed by DNS server 190 to addresses IP1 will now connect to controller 120A.

Controller 120B is taken offline and upgraded. This will cause established stateful sessions between computing devices 170 and controller 120B to be aborted. However, a single reconnect request by a computing device 170 may reestablish the stateful session with upgraded controller 120A that now has the moved IP address. An I/O request for a stateless protocol may be lost, but a retry after timeout at the computing device will redirect the request to the controller that now has the moved IP request.

At time T3, similar to the events at time T2, software upgrade controller 160 identifies the next controller to upgrade, for example, controller 120C, and transfers the IP addresses of controller 120C, represented by IP address IP2, to newly upgraded controller 120B, which is brought online. Controller 120C is taken offline and upgraded.

At time TF, software upgrade controller 160 transfers the IP addresses IP3 of controller 120D to newly upgraded controller 120C, which is brought online. Controller 120C is taken offline and upgraded. In this embodiment, newly upgraded controller 120D replaces controller 120A in the role of hot spare, and is put into hot spare standby mode.

In certain embodiments, each live controller 120 may have several access points 130, each having an associated IP address. In these embodiments, software upgrade controller 160 may transfer all IP addresses of a controller 120 to be upgraded to another controller prior to taking the controller to be upgraded offline. Similarly, each controller 120 may represent a set of physical controllers, each associated with one or more IP addresses. In these embodiments, software upgrade controller 160 may transfer all IP addresses of the set of controllers to be upgraded to another set of controllers prior to taking the controllers to be upgraded offline.

Figure 3:
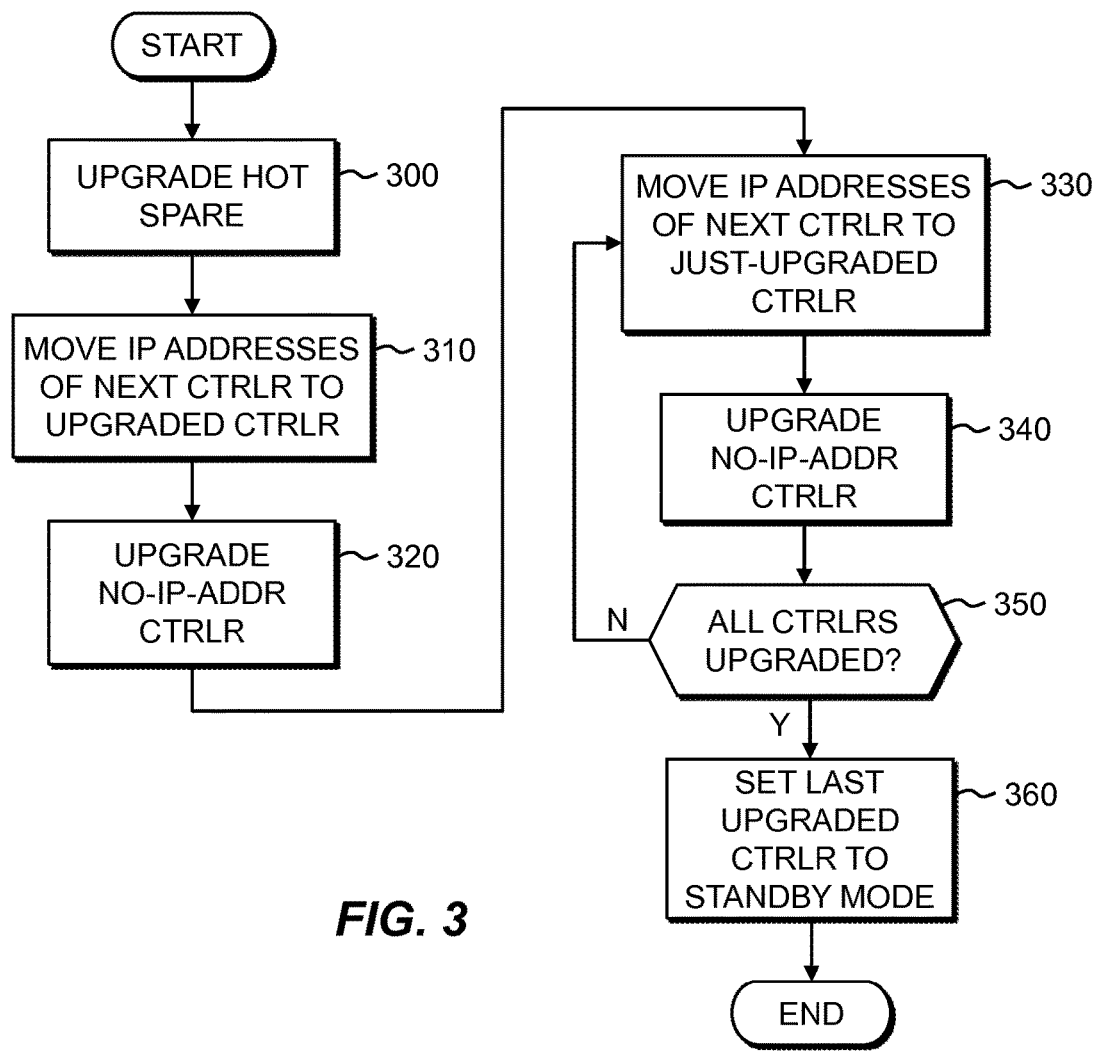
FIG. 3 is a flowchart depicting operational steps of software upgrade controller 160 when performing the upgrade operation illustrated in FIG. 2, in accordance with an embodiment of the invention.

FIG. 3 is a flowchart depicting operational steps of software upgrade controller 160 when performing the upgrade operation illustrated in FIG. 2, in accordance with an embodiment of the invention. Software upgrade controller 160 first takes the hot spare controller out of standby mode, and performs a software upgrade to the controller (step 300). Software upgrade controller 160 then moves the IP addresses of the next controller to be upgraded to the newly upgraded controller (step 310). Software upgrade controller 160 upgrades the controller whose addresses were just moved to the hot spare controller (step 320).

The IP addresses of the next controller to be upgraded are moved to the just upgraded controller (step 330), and the controller whose IP addresses were moved is upgraded (step 340). If all controllers have not been upgraded (decision step 350, "N" branch), these last steps are repeated. If all controllers have been upgraded (decision step 350, "Y" branch), then the last controller to be upgraded becomes the new hot spare controller and is put into standby mode (step 360), and the upgrade process ends.

Figure 4:
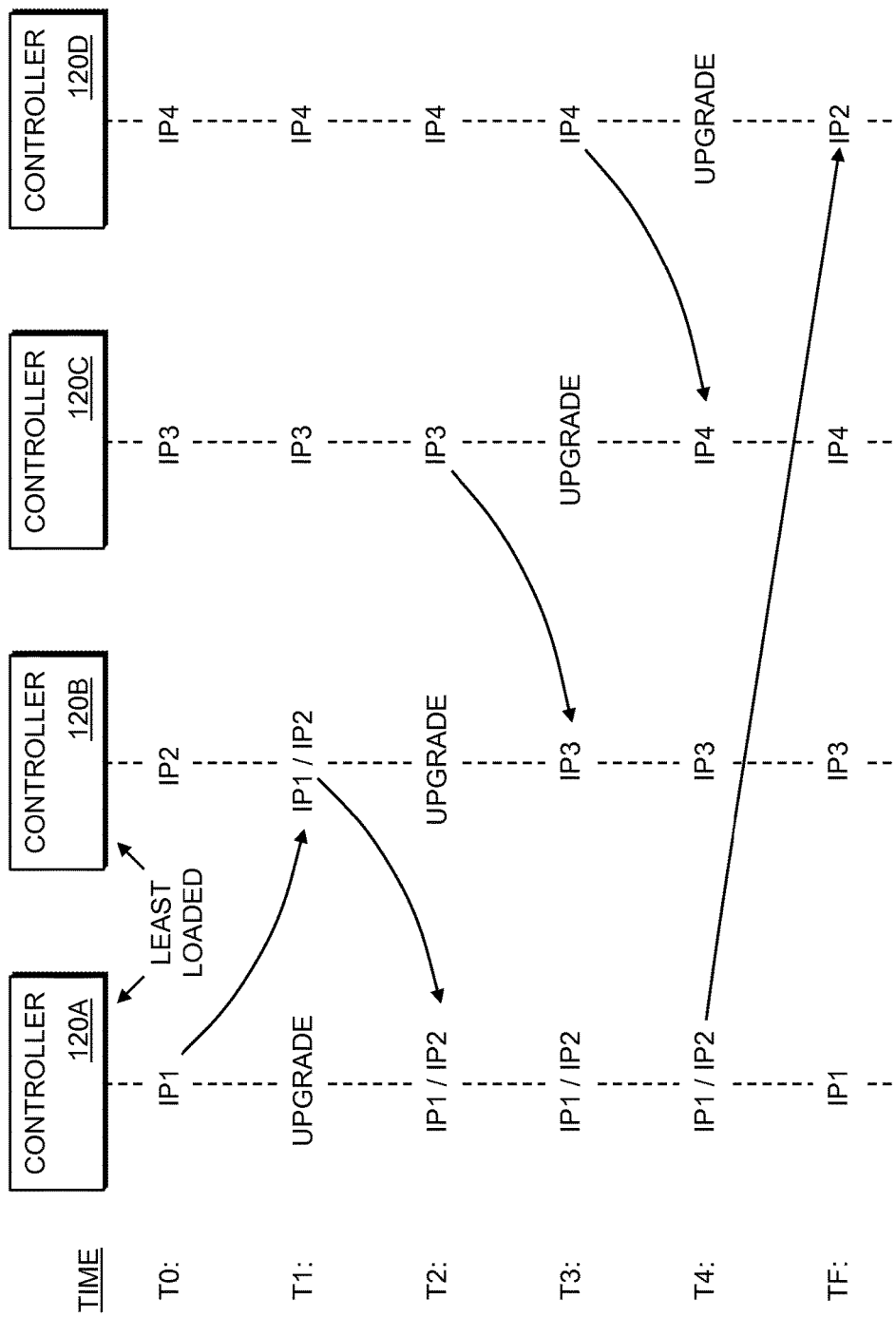
FIG. 4 is a diagram illustrating a second upgrade operation, in accordance with an embodiment of the invention.

FIG. 4 is a diagram illustrating a second upgrade operation, in accordance with an embodiment of the invention. In this embodiment of network-attached storage system 110, all controllers 120 are live and there is no hot spare. At T0, controllers 120B, 102C, and 120D are in normal operation.

At time T1, the least loaded and second least loaded controllers are identified. In this embodiment, controller 120A is the least loaded controller, and controller 120B is the second least loaded. Software upgrade controller 160 transfers the IP addresses IP1 of least loaded controller 120A to second least loaded controller 120B, and controller 120A is taken offline. In this embodiment, controller 120B now has two sets of IP addresses assigned—IP1 and IP2. This may be accomplished, for example, by software upgrade controller 160 issuing a command to assign the moved addresses as secondary addresses on a NIC card of controller 120B. Software upgrade controller 160 then performs a software upgrade to controller 120A.

At time T2, software upgrade controller 160 moves addresses IP1 and IP2 of controller 120B to the just upgraded controller 120A, and controller 120A is brought online. Controller 120B is taken offline and upgraded. Similarly, at time T3, software upgrade controller 160 moves addresses IP3 of controller 120C to the just upgraded controller 120B, and controller 120B is brought online. Controller 120C is taken offline and upgraded. At time T4, software upgrade controller 160 moves addresses IP4 of controller 120D to the just upgraded controller 120C, and controller 120C is brought online. Controller 120D is taken offline and upgraded.

At time TF, software upgrade controller 160 moves IP addresses IP2 of controller 120A to just upgraded controller 120D, and controller 120D is brought online. Controller 120A, which had two sets of IP addresses assigned, now has a single set of IP address assigned—IP1, as do all controllers 120, and all controllers 120 are online and available to computing devices 170.

Figure 5:
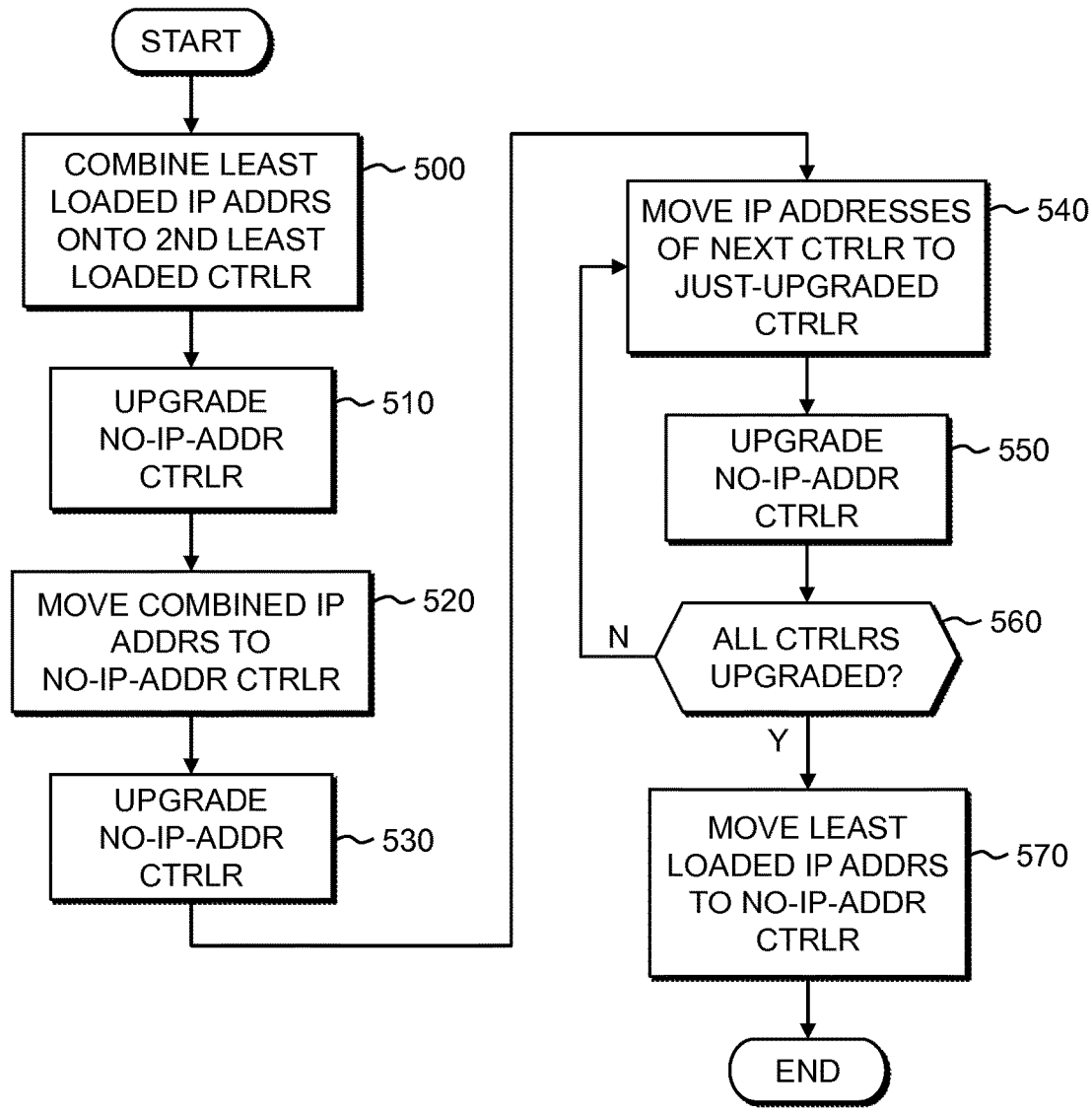
FIG. 5 is a flowchart depicting operational steps of software upgrade controller 160 when performing the upgrade operation illustrated in FIG. 4, in accordance with an embodiment of the invention.

FIG. 5 is a flowchart depicting operational steps of software upgrade controller 160 when performing the upgrade operation illustrated in FIG. 4, in accordance with an embodiment of the invention. Software upgrade controller 160 first determines the least and second least loaded controllers 120. The IP addresses of the least loaded controller are moved to the second least loaded controller (step 500). Thus, the load impact to the controller of handling the work of two controllers 120 may be minimized. Software upgrade controller 160 takes the least loaded controller offline and performs an upgrade operation on it (step 510). The combined IP addresses of the second least loaded controller are moved to the just upgraded controller (step 520), and the second least loaded controller is upgraded (step 530).

The IP addresses of the next controller to upgrade are moved to the just upgraded controller (step 540) and the just upgraded controller is brought online, and the controller to upgrade is taken offline and upgraded (step 550). If all controllers have not been upgraded (decision step 560, "N" branch), these last steps are repeated.

When all controllers have been upgraded (decision step 560, "Y" branch), the IP addresses of the second controller that were combined and moved to the first controller are moved to the last controller upgraded (step 570), and this processing ends. Thus, all controllers are now upgraded, and IP addresses that were assigned to a single controller are now assigned to a single controller, although not necessarily to the controller that originally had the IP addresses.

Figure 6:
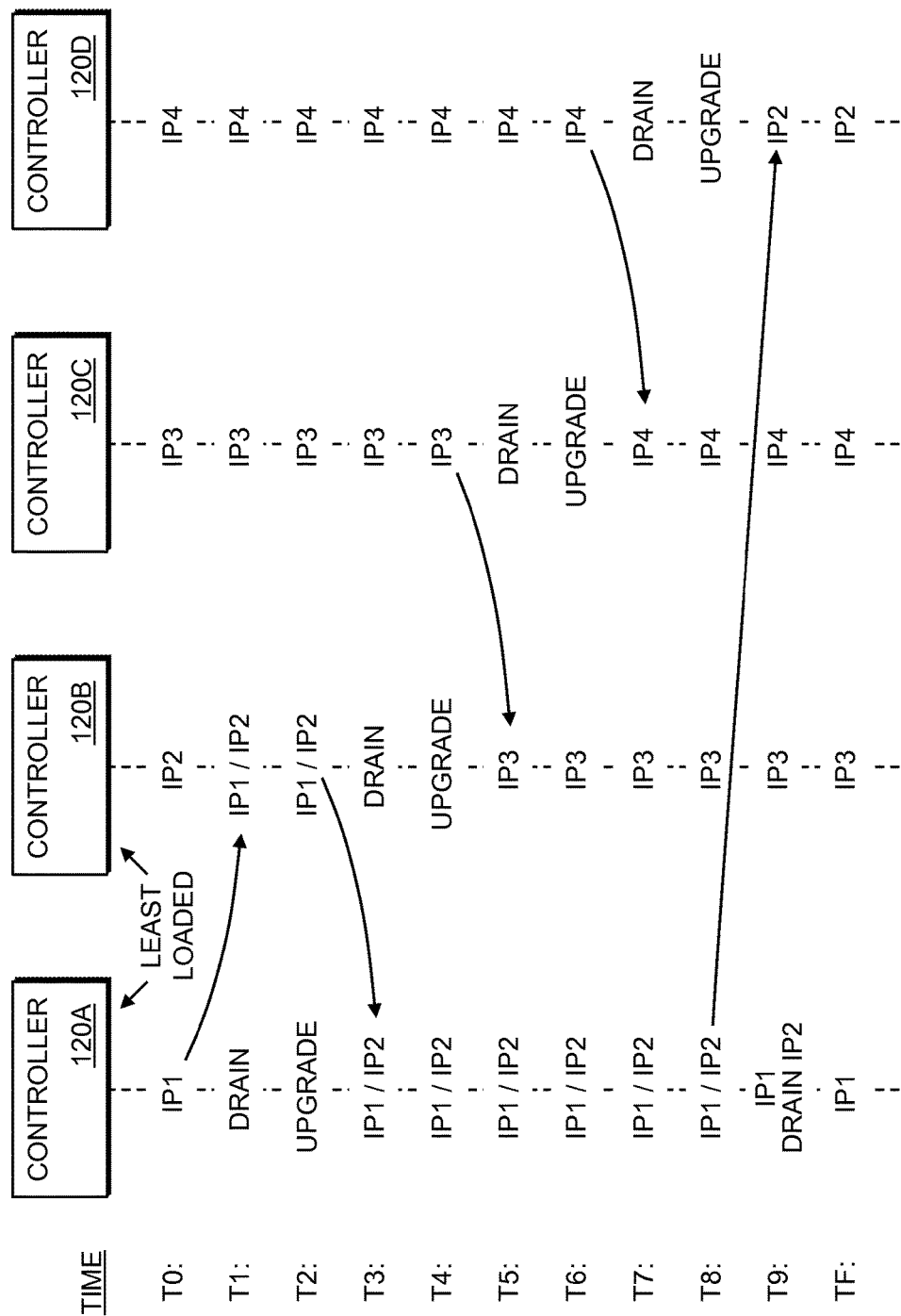
FIG. 6 is a diagram illustrating a third upgrade operation, in accordance with an embodiment of the invention.

FIG. 6 is a diagram illustrating a third upgrade operation, in accordance with an embodiment of the invention. This embodiment of network-attached storage system 110 is essentially the same as the embodiment described above with respect to FIG. 4, with the addition that after the IP addresses of a controller to be upgraded are moved to another controller, and before the controller to be upgraded is taken offline, current stateful sessions between, for example, a computing device 170 and the controller to be upgraded are allowed to "drain" from the controller. This is indicated in FIG. 6 at times T1, T3, T5, T7, and T9. Draining a controller of stateful sessions maybe accomplished, for example, by waiting a predetermined interval of time before the controller to be upgraded is taken offline. Alternatively, a controller may be considered drained if utilization of the controller falls below a threshold value, for example, the number of stateful connections falls below a threshold number, the sessions that complete per unit of time falls below a threshold number, or a combination of any of these.

Figure 7:
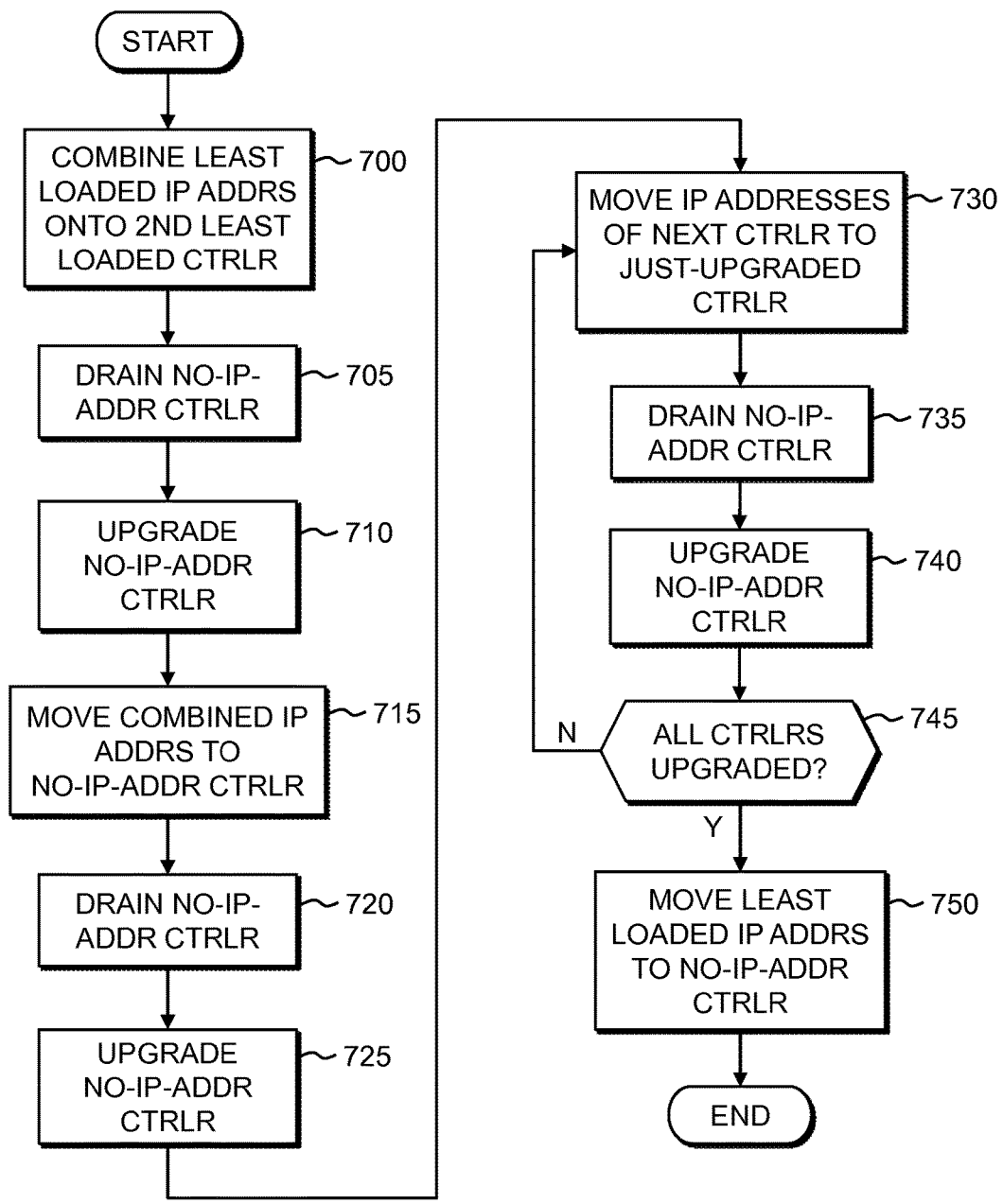
FIG. 7 is a flowchart depicting operational steps of software upgrade controller 160 when performing the upgrade operation illustrated in FIG. 6, in accordance with an embodiment of the invention.

FIG. 7 is a flowchart depicting operational steps of software upgrade controller 160 when performing the upgrade operation illustrated in FIG. 6, in accordance with an embodiment of the invention. As with FIG. 6, the embodiment described in the flowchart of FIG. 7 is essentially the same as the embodiment described in relation to the flowchart of FIG. 5, with the addition of steps or processes that drain a controller to be upgraded after the IP addresses of the controller have been moved, and before the controller is taken offline. This additional activity is indicated in FIG. 7 at steps 705, 720, and step 735.

Figure 8:
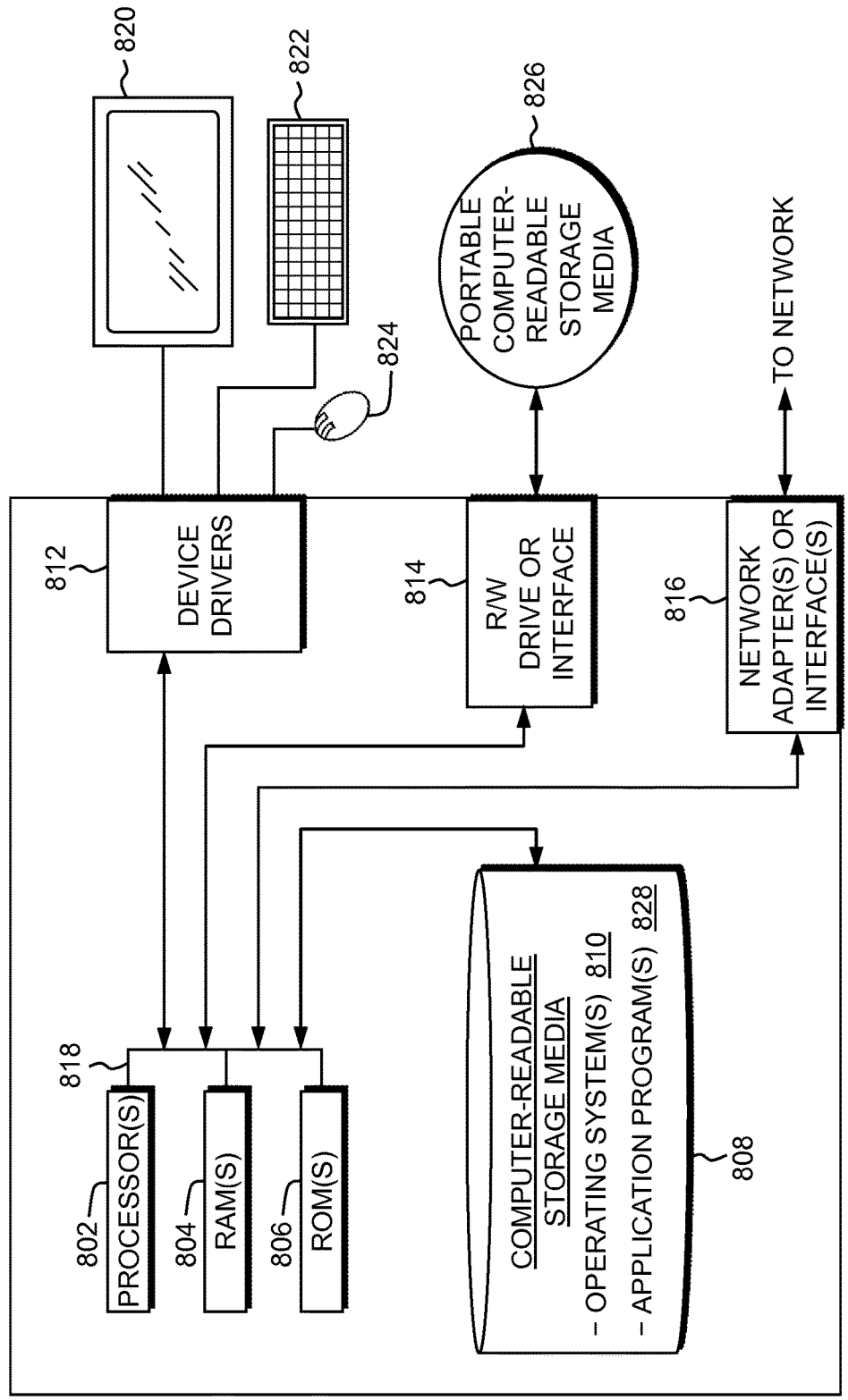
FIG. 8 depicts a block diagram of exemplary components of a computing devices of the NAS system environment of FIG. 1, in accordance with an embodiment of the present invention.

FIG. 8 depicts a block diagram of exemplary components of a computing device 170, DNS server 190, a controller 120, software upgrade controller 160, and/or a network-attached storage device 140 of the NAS system environment 100 of FIG. 1, in accordance with one or more embodiments of the present invention. It should be appreciated that FIG. 8 provides only an illustration of one implementation and does not imply any limitations with regard to the environments in which different embodiments may be implemented. Many modifications to the depicted environment may be made.

These devices can include one or more processors 802, one or more computer-readable RAMs 804, one or more computer-readable ROMs 806, one or more tangible storage devices 808, device drivers 812, read/write drive or interface 814, network adapter(s) or interface(s) 816, all interconnected over a communications fabric 818. Communications fabric 818 can be implemented with any architecture designed for passing data and/or control information between processors (such as microprocessors, communications and network processors, etc.), system memory, peripheral devices, and any other hardware components within a system.

One or more operating systems 810, and application programs 828, are stored on one or more of the computer-readable tangible storage devices 808 for execution by one or more of the processors 802 via one or more of the respective RAMs 804 (which typically include cache memory). In the illustrated embodiment, each of the computer-readable tangible storage devices 808 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

These devices can also include a R/W drive or interface 814 to read from and write to one or more portable computer-readable tangible storage devices 826. Each device may include one or more application program(s) 828 that can be stored on one or more of the portable computer-readable tangible storage devices 826, read via the respective R/W drive or interface 814 and loaded into the respective computer-readable tangible storage device 808.

These devices can also include network adapter(s) or interface(s) 816, such as a TCP/IP adapter card or wireless communication adapter (such as a 4G wireless communication adapter using OFDMA technology). Application program(s) 828 on these devices can be downloaded to the device from an external computer or external storage device via a network (for example, the Internet, a local area network or other, wide area network or wireless network) and network adapter(s) or interface(s) 816. From the network adapter(s) or interface(s) 816, the programs are loaded into the computer-readable tangible storage device 808. The network may comprise copper wires, optical fibers, wireless transmission, routers, firewalls, switches, gateway computers and/or edge servers. Where the exemplary components of the block diagram of FIG. 8 represent a computing device 170, network-attached storage system 110 may be accessed via the network adapter(s) or interface(s) 816.

These devices can also include a display screen 820, a keyboard or keypad 822, and a computer mouse or touchpad 824. Device drivers 812 interface to display screen 820 for imaging, to keyboard or keypad 822, to computer mouse or touchpad 824, and/or to display screen 820 for pressure sensing of alphanumeric character entry and user selections. The device drivers 812, R/W drive or interface 814 and network adapter(s) or interface(s) 816 can comprise hardware and software (stored in computer-readable tangible storage device 808 and/or ROM 806).

Where the exemplary components of the block diagram of FIG. 8 represent a network-attached storage device 140, operating system(s) 810 may be one or more operating system that are specially designed to efficiently address the requirements of a network-attached storage system. In addition, in some embodiments, access to a network-attached storage device 140, such as for maintenance and other administrative functions, is typically via its network adapter(s) or interface(s) 816, and there may be no attached display screen 820, keyboard or keypad 822, or computer mouse or touchpad 824.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for performing maintenance to controllers in a network-attached storage system that includes two or more controllers, each controller including one or more associated IP addresses, the method comprising:
   identifying, by a computer, an online controller in the network-attached storage system to upgrade, wherein the network-attached storage system is a special purpose computer that provides a plurality of file-based storage services to a plurality of other computing devices, wherein the network-attached storage system is connected to a domain name server, wherein the domain name server is not resent as a failover solution for the network-attached storage system, and wherein the network-attached storage system includes a hot spare controller in a standby mode:
   transmitting, by the computer, the one or more associated IP addresses of the online controller to upgrade to a hot spare controller in the network-attached storage system, wherein the hot spare controller is taken out of the standby mode and upgraded before the one or more associated IP addresses are transmitted;

simultaneous with when the hot spare controller is online, taking, by the computer, the online controller to upgrade offline, wherein taking the online controller to upgrade offline further comprises draining, by the computer, the online controller to upgrade, and wherein draining the online controller comprises removing all of a plurality of stateful sessions from the online controller to upgrade before taking the online controller offline; and upgrading, by the computer, the controller to upgrade.

2. A method in accordance with claim 1, wherein the other controller is online when the one or more associated IP addresses of the online controller to upgrade are moved to the other controller, whereby the other controller includes at least two associated IP addresses, the method further comprising:

moving, by the computer, the one or more associated IP addresses back to the controller to upgrade after the controller to upgrade has been upgraded; and bringing, by the computer, the upgraded controller online.

3. A method in accordance with claim 2, wherein identifying an online controller in the network-attached storage system to upgrade further comprises identifying, by the computer, a least loaded controller and a second least loaded controller.

4. A method in accordance with claim 1, wherein draining the online controller to upgrade includes one or more of: waiting a predetermined period of time; waiting until utilization of the online controller to upgrade falls below a threshold value.

5. A computer program product for performing maintenance to controllers in a network-attached storage system that includes two or more controllers, each controller including one or more associated IP addresses, the computer program product comprising:

one or more non-transitory computer readable tangible storage media and program instructions stored on at least one of the one or more non-transitory computer-readable tangible storage media, the program instructions executable by a processor, the program instructions comprising:

program instructions to identify, by a computer, an online controller in the network-attached storage system to upgrade, wherein the network-attached storage system is a special purpose computer that provides a plurality of file-based storage services to a plurality of other computing devices, wherein the network-attached storage system is connected to a domain name server, wherein the domain name server is not resent as a failover solution for the network-attached storage system, and wherein the network-attached storage system includes a hot spare controller in a standby mode;

program instructions to transmit, by the computer, the one or more associated IP addresses of the online controller to upgrade to a hot spare controller in the network-attached storage system, wherein the hot spare controller is taken out of the standby mode and upgraded before the one or more associated IP addresses are transmitted;

simultaneous with when the hot spare controller is online, program instructions to take, by the computer, the online controller to upgrade offline, wherein taking the online controller to upgrade offline further comprises draining, by the computer, the online controller to upgrade, and wherein draining the online controller comprises removing all of a plurality of stateful sessions from the online controller to upgrade before taking the online controller offline; and program instructions to upgrade, by the computer, the controller to upgrade.

6. A computer program product in accordance with claim 5, wherein the other controller is online when the one or more associated IP addresses are moved to the other controller, whereby the other controller includes at least two associated IP addresses, the computer program product further comprising: program instructions to move the one or more associated IP addresses of the controller to upgrade back to the controller to upgrade after the controller to upgrade has been upgraded; and program instructions to bring the upgraded controller online.

7. A computer program product in accordance with claim 6, wherein the program instructions to identify an online controller in the network-attached storage system to upgrade further comprises program instructions to identify a least loaded controller and a second least loaded controller.

8. A computer program product in accordance with claim 5, wherein the program instructions to drain the online controller to upgrade includes one or more of: program instructions to wait a predetermined interval of time; program instructions to wait until utilization of the online controller to upgrade fails below a threshold value.

9. A computer system for performing maintenance to controllers in a network-attached storage system that includes two or more controllers, each controller including one or more associated IP addresses, the computer system comprising:

one or more computer processors, one or more computer-readable memories, one or more non-transitory computer-readable tangible storage media, and program instructions stored on at least one or more of the non-transitory tangible computer-readable storage media for execution by at least one of the one or more processors via at least one of the one or more computer-readable memories, wherein the computer system is capable of performing a method comprising:

identifying, by a computer, an online controller in the network-attached storage system to upgrade, wherein the network-attached storage system is a special purpose computer that provides a plurality of file-based storage services to a plurality of other computing wherein the network-attached storage system is connected to a domain name server, wherein the domain name server is not present as a failover solution for the network attached storage system, and wherein the network-attached storage system includes a hot spare controller in a standby mode;

transmitting, by the computer, the one or more associated IP addresses of the online controller to upgrade to a hot spare controller in the network-attached storage system, wherein the hot spare controller is taken out of the standby mode and upgraded before the one or more associated IP addresses are transmitted;

simultaneous with when the hot spare controller is online, taking, by the computer, the online controller to upgrade offline, wherein taking the online controller to upgrade offline further comprises draining, by the computer, the online controller to upgrade, and wherein draining the online controller comprises removing all of a plurality of stateful sessions from the online controller to upgrade before taking the online controller offline; and upgrading, by the computer, the controller to upgrade.

10. A computer system in accordance with claim 9, wherein the other controller is online when the one or more associated IP addresses of the online controller to upgrade are moved to the other controller, whereby the other controller includes at least two associated IP addresses, the computer system further comprising: moving the one or more associated IP addresses back to the controller to upgrade after the controller to upgrade has been upgraded; and bringing the upgraded controller online.

11. A computer system in accordance with claim 10, wherein identifying an online controller in the network-attached storage system to upgrade further comprises identifying a least loaded controller and a second least loaded controller.

12. A computer system in accordance with claim 9, wherein draining the online controller to upgrade includes one or more of: waiting a predetermined interval of time; waiting unto utilization of the online controller to upgrade falls below a threshold value.

\* \* \* \* \*